United States Patent [19]
Brunner

[11] 3,757,208
[45] Sept. 4, 1973

[54] METHOD AND APPARATUS FOR BALANCING AN APPARATUS USED FOR MEASURING THE THICKNESS OF LAYERS

[75] Inventor: Mathias Brunner, Alfermee, Switzerland

[73] Assignee: Zumbach Electronic-Automatic, Orpund/Biel, Berne, Switzerland

[22] Filed: June 19, 1972

[21] Appl. No.: 264,175

Related U.S. Application Data
[63] Continuation-in-part of Ser. No. 30,542, April 20, 1970, abandoned.

[30] Foreign Application Priority Data
Apr. 23, 1969 Germany .................. P 19 20 709.9

[52] U.S. Cl. ...................... 324/34 TK, G01r/35/00
[51] Int. Cl. ........................................... G01r 33/12
[58] Field of Search ............... 324/34 R, 34 TK, 324/40, 61 R; 73/1 M, 1 R; 331/64, 65

[56] References Cited
UNITED STATES PATENTS
2,581,394 1/1952 Dinger ............................ 324/34 TK
3,478,262 11/1969 Vigil ................................. 324/34 R FOREIGN PATENTS OR APPLICATIONS
761,241 11/1956 Great Britain .................... 324/61 R Primary Examiner—Robert J. Corcoran
Attorney—Dwight H. Smiley et al.

[57] ABSTRACT

A method and device for measuring the thickness of layers, particularly of insulating layers on metallic parts. A measuring signal is produced corresponding to the thickness to be measured and this signal is compared with a comparing signal, balancing means being provided for adjusting both signals independently of the variations of the measuring signal by the measuring object, and means being provided for shifting one of said signals by a constant amount equal to the shift of said measuring signal upon removal of the measuring probe from the influencing range of a measuring object, reference balancing being thus possible with said measuring probe removed from the measuring object and said one signal shifted by said constant amount.

25 Claims, 4 Drawing Figures

METHOD AND APPARATUS FOR BALANCING AN APPARATUS USED FOR MEASURING THE THICKNESS OF LAYERS

CROSS-REFERENCE TO RELATED APPLICATION

This application is a continuation-in-part of my copending application, Ser. No. 30,542, filed Apr. 20, 1970 and now abandoned.

BACKGROUND OF THE INVENTION

This invention relates to a method and device for balancing of a device for measurement of thicknesses wherein during measurement a measuring probe, such as a coil excited by alternating current, is influenced by a measuring object in accordance with the thickness of a layer of the measuring object, and wherein the measuring value determined by the probe, for instance a voltage or frequency, is compared with a corresponding comparing value, the difference of both values being determined and indicated as an equivalent of the thickness of said layer.

Particular problems arise in this type of measuring device due to the often low stability of the circuits producing the measuring value and comparing value, particularly measuring frequency and comparing frequency, these circuits being affected by influences having no relation to the measurement, for instance by temperature fluctuations. Although it may be assumed that under the same circumstances the measuring value and the comparing value undergo the same drift so that their drift does not cause measuring errors, the circumstances are in fact rarely the same.

This problem, which is difficult to be mastered when using a single measuring probe, is often avoided in practical embodiments by the use of a number of probes, such probes being used for indicating whether differences of the layer thickness are detected at different measuring places. Such prior systems, however, are unable to detect and indicate absolute values for the layer thickness. It is also known to provide a single probe and to move it along the object to be measured, for instance about a cable on which the insulating thickness is to be measured, it being possible to determine whether the measuring value is constant or not in order to know whether there are differences in thickness or not. However, no reliable measurement of the absolute thickness of the layer is possible with this prior system because it is practically impossible to compensate for drift of the zero balance during measurement.

SUMMARY OF THE INVENTION

In accordance with the present invention a balancing method and system is set forth for devices for measurement of thicknesses. The invention allows reliable measurement of absolute values of the layer thickness by means of a single measuring probe. The method is based on a simple and rapid new balancing of the measuring system without calibrating sample, the operations being performable at any time during the measurement for checking the indicated value. The method according to this invention is broadly characterized in that prior to measurement a zero balancing under measuring conditions is effected with the measuring probe placed a nominal thickness from a calibrated standard, and by adjusting the one of said values, namely the comparing value or the measuring value until zero balancing is obtained. A zero balancing under reference conditions is effected with the measuring probe completely removed from the influence of a calibrated or measuring object, said one value being shifted by a predetermined change of the circuit conditions to a reference value while said other value, namely the measuring value or the comparing value is adjusted until zero balancing is obtained, balancing under reference conditions being repeatedly effected during measurement for obtaining therewith indirect balancing under measuring conditions.

Thus in accordance with the invention zero balancing under reference conditions is rendered feasible by entirely removing the measuring probe from the range of influence of any measuring or calibrating object, the influence on the measuring value by this complete removal of the measuring probe outside the zone of influence being compensated by varying the circuit conditions, and balancing under these conditions. If the measuring probe is then returned into its measuring position and the circuit condition is restored to normal conditions it may be assumed, and extensive experiments have proved with astonishing reliability, that compensation remains correct for the measuring condition.

This invention also relates to apparatus for carrying out the above method. This apparatus broadly comprising a measuring probe, a measuring circuit associated therewith, a comparing source and a comparing circuit having a measuring output, means for removing said measuring probe from the range of influence of a measuring object or calibrating object, said measuring circuit and comparing source having each balancing elements independent from said probe for changing their output values, the one of said measuring circuit or comparing source being adapted for disconnection from its balancing element and connection to a fixed reference circuit for predetermined influence onto its output value.

As mentioned above, it is an essential advantage of this invention that simple and reliable zero balancing may be effected at any time and repeatedly during measurement, this allowing a reliable measurement of absolute values. However, this also requires calibration of the measuring device. Therefore, it is a further object of this invention to provide a method and device allowing particularly simple calibration and balancing, briefly, for preparing the device for measurement.

Up to now calibration and zero balancing have been effected by means of accurate samples of measuring objects or calibration objects. It is expensive to prepare and store such caibrating samples for a wide variety of different objects to be measured. The calibrating samples have to be equivalent to the objects to be measured in every respect. As an example, the metallic conductor and insulation of the sample of a cable should be an exact copy of the cable to be measured.

The embodiment of this invention, allows substantial simplification and improvement of the versatility of balancing and calibration of the measuring equipment and broadly comprises at least one adjustable carrier with measuring equipment for reading the position and displacement respectively of this carrier, said carrier having at least one supporting structure for mounting at least one measuring assembly or of a measuring object or calibrating object thereon. It will be explained in detail for different circumstances that this auxiliary calibrating and zero balancing device allows precise adjustment of a definite distance between a measuring assembly and a calibrating sample for calibration or zero balancing. Bare conductors of cables or the like may be used as a calibrating sample.

DETAILED DESCRIPTION OF THE INVENTION

Figure 1:
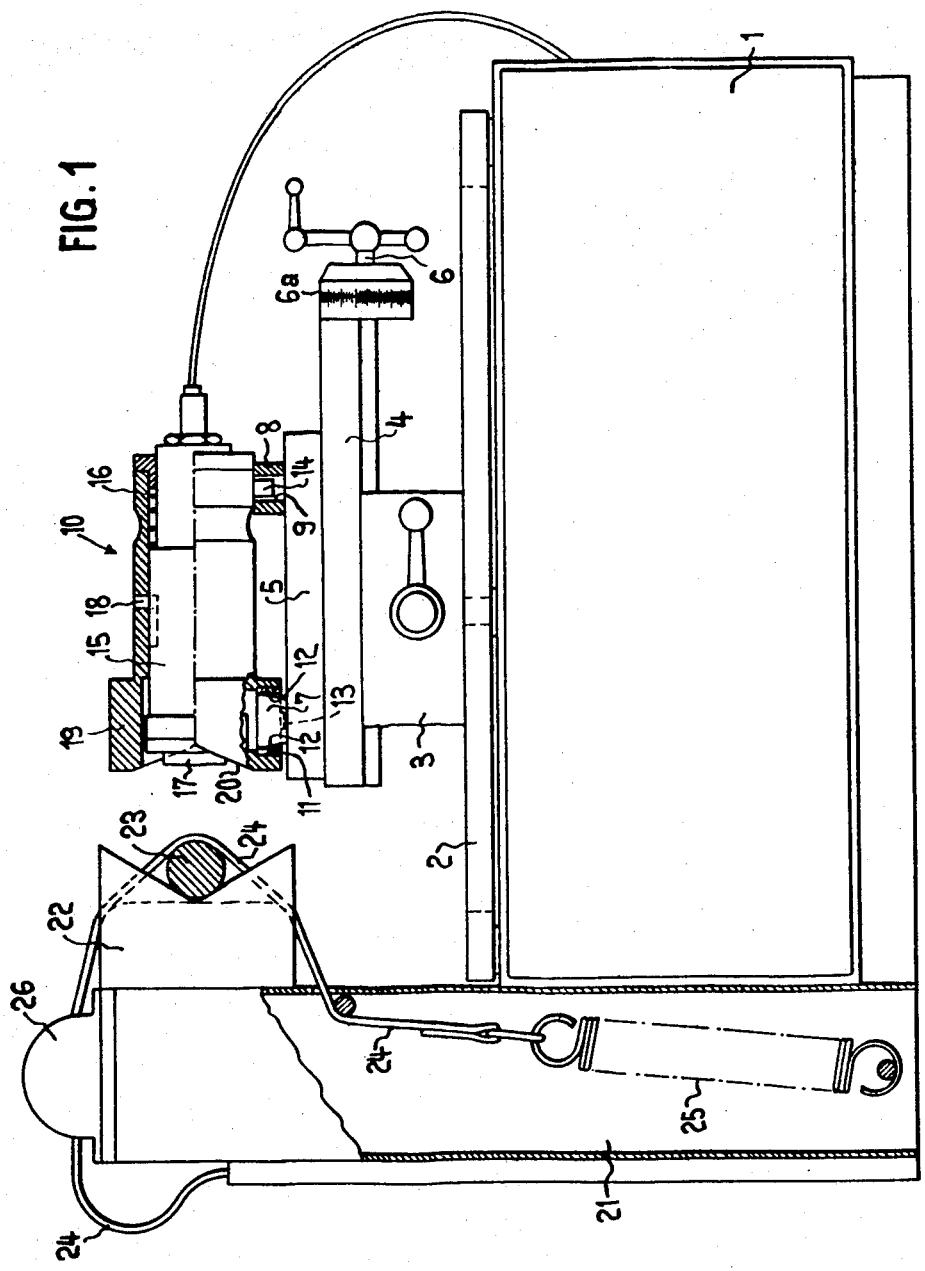
FIG. 1 is a side view of the device, partially in section.

The device for measurement of thicknesses of FIG. 1 has a casing 1 for accommodation of the electric circuit. A flat iron 2 having a longitudinal slit is fixed on top of the casing 1. The base 3 of a headstock 4 is fixed on the flat iron by means of a manually operable clamping device. A slide 5 is displaceable along the guide profile 4 of the headstock by means of a spindle 6. On a scale 6a the position of the slide may be read in a manner usual for headstocks of machine tools.

Fixed on slide 5 are a convex centering pin 7 and a centering eye 8 having an oblong hole or slit 9. A measuring assembly 10 may be pluged onto centering members 7 and 8 of the slide 5 in a well-defined position. Measuring assembly 10 is connected to the electrical circuit by means of a cable. The casing of assembly 10 has a bushing 11 with spring loaded balls 12 engaging the lower inwardly inclined portion of pin 7 when the measuring assembly is mounted on slide 5 thereby securing the measuring assembly on slide 5. The position of the measuring assembly is determined in vertical direction by stop pins 13. The position is further determined by engagement of a pin 14 into oblong hole 9. A sleeve 15 is axially displaceable in the casing of the measuring assembly 10, sleeve 15 being urged to the left into the illustrated end portion of a pressure spring 16 as long as no forces act on the outer end 17 of sleeve 15. The end position of sleeve 15 is determined by a pin 18 engaging a slit of sleeve 15. The measuring probe, for instance a coil, is located at the outer end 17 of sleeve 15. The widened annular end 19 of the casing surrounding this end of sleeve 15 has a diametrical prismatic groove 20 serving for centering a measuring or calibrating object relative to the measuring probe.

Two columns 21 are fixed at the one end of casing 1, such columns being interconnected by a support 22. This support 22 has a prismatic groove for receiving a calibrating sample 23 in a determined position. This sample is held by means of tapes 24 of which the one end is connected to a spring 25 inside a column 21, such tapes being held in tape stoppers 26 on top of the columns. The tapes may be pulled through such stoppers and fixed in any desired position.

Figure 2:
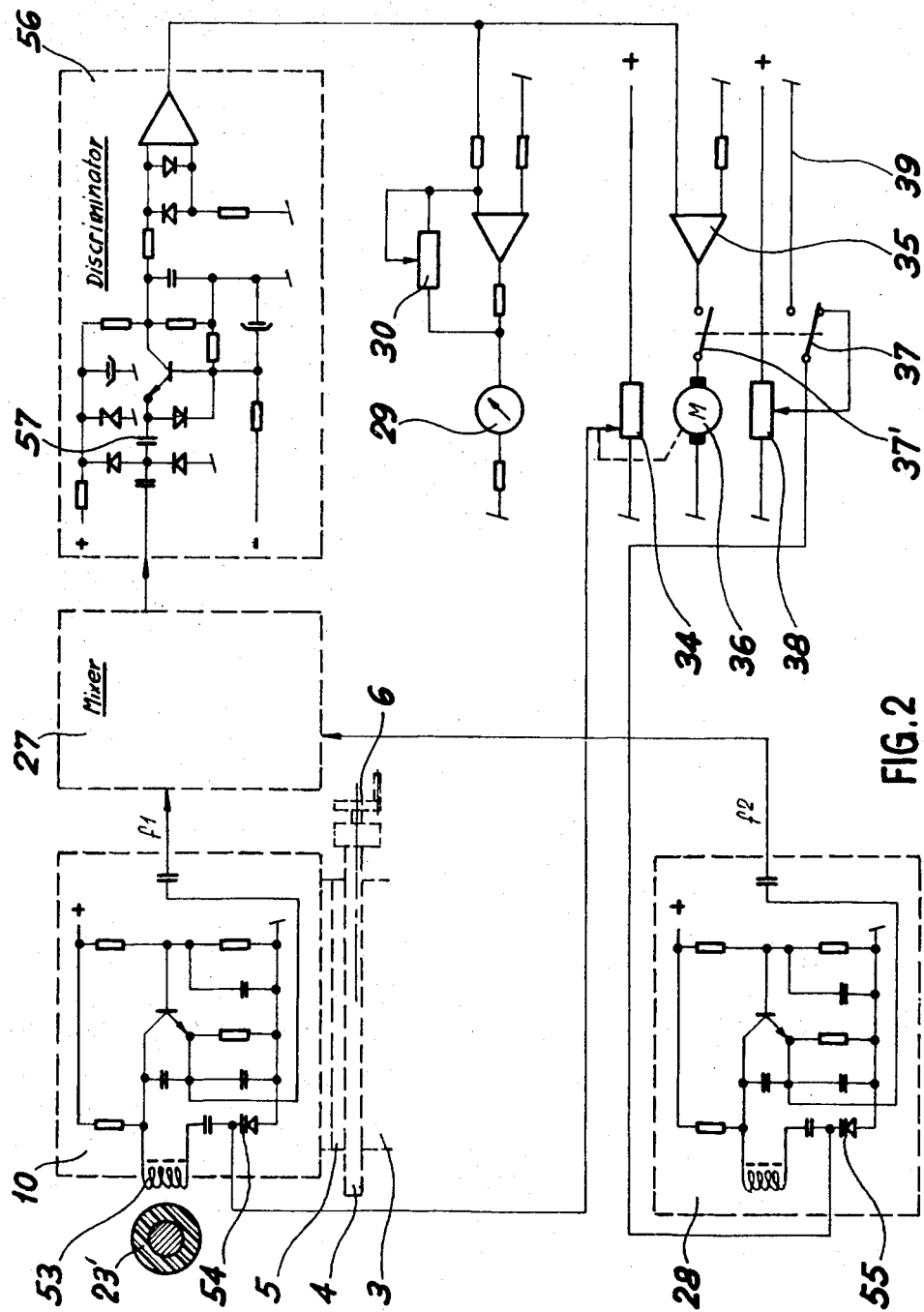
FIG. 2 schematically illustrates the electric circuit serving for balancing and calibration and measurement of the device shown in FIG. 1.

FIG. 2 illustrates the electronic circuit as far as deemed necessary for a full understanding of the invention. The slide 5, the spindle 6 and the measuring assembly 10 and a calibrating sample 23' are schematically illustrated in this figure. A measuring oscillator is accommodated in the measuring assembly, the frequency of this oscillator being $f_1$. This frequency is influenced by the measuring coil 53 when the magnetic field of the coil 53 is influenced by metallic parts. The measuring frequency $f_1$ is applied to a mixer 27 and mixed therein with a reference or comparing frequency $f_2$ from a comparing oscillator 28. The beat frequency from the mixer 27 is applied to a discriminator 56. The output signal of the discriminator 56 is applied to an amplifier with variable gain by means of a potentiometer 30. The output signal of said amplifier is indicated by a measuring instrument 29. Sensitivity of the indication may be adjusted by means of said potentiometer 30 schematically illustrated in FIG. 2. The frequency of the measuring oscillator may be changed by means of variable - capacity - diode 54 through a potentiometer 34. Operation of the potentiometer 34 for zero balancing is effected through an amplifier 35 and a servo motor 36 as indicated by a dotted line between servo motor 36 and the slider of potentiometer 34. Variation of the frequency of the comparing oscillator 28, as for example by means of variable - capacity diode 55, is selectively effected through a change - over switch 37 by a fixed potential indicated in FIG. 2 by the ground 39 or by a variable potential adjustable by means of a potentiometer 38. Switch 37 works simultaneously with contact 37' which controls the servo motor.

FIG. 1 illustrates the measuring assembly at a predetermined distance from the calibrating sample 23. This sample is a metal cylinder corresponding in size and electrical properties to the conductor of an object to be measured subsequently. If, as an example, a cable is to be measured subsequently, a copper cylinder of a diameter equal to the diameter of the cable conductor is used. Instead of a solid cylinder a tube of sufficient wall thickness may be used provided its effect on the measuring coil is the same.

It is assumed that for the position of the measuring assembly 10 shown in FIG. 1 the measuring coil 53 is outside the range of influence of the sample 23. By means of the servo control 35, 36 and potentiometer 34 the frequency $f_1$ of the measuring oscillator is now so adjusted that the instrument 29 is set to zero. Servo - control may be fully automatic, that is, potentiometer 34 is adjusted until zero voltage appears at the input of amplifier 35. Subsequently a reference adjustment is effected in that the measuring assembly 10 mounted on slide 5 is approached to the sample 23 to a distance equal to the nominal layer thickness of the object to be measured; that is, the face 17 is approached to the metal cylinder 23 to a distance equal to said nominal thickness. The measuring oscillator is now influenced by the sample 23', whereby its frequency $f_1$ is changed. This frequency drift is now compensated with switch 37 connected to the potentiometer 38 by adjustment of the latter to a value for which the frequency $f_2$ of the comparing oscillator has been shifted by an amount corresponding to the frequency drift of $f_1$, so that the instrument will again indicate zero voltage. In this way zero balance of the system is made for two conditions, namely a reference condition wherein the measuring probe is not influenced by the measuring object and a measuring condition in which the measuring probe is adjusted to nominal thickness of the layer. It will be explained below that during the following measurement the zero balancing under reference conditions may replace the zero balancing under measuring conditions, because it is equivalent to the same.

When balancing to zero for nominal thickness has been effected as stated above, the measuring assembly 10 is moved away from sample 23 by means of spindle 6 by a suitable amount, for instance by 1 mm. After this displacement the measuring instrument 29 indicates a measuring value, because the frequency of the measuring oscillator has been changed by the displacement. By adjustment of the sensitivity of the instrument the indication is now adjusted to a suitable value of the instrument scale. If, as an example, the instrument is now adjusted to scale division 10 for the displacement of the measuring assembly by 1 mm, the instrument will indicate over - thickness or under - thickness of 0.1 mm by one scale division.

In this way the device is prepared for measurement. The measuring assembly is now removed from its carrier 5 and may be applied with its prism 20 against an object to be tested, for instance a cable. The face 17 thereby touches the cable and the sleeve 15 with the measuring coil will be moved inwards against the pressure of spring 16 until the measuring object touches the surfaces of prism 20. The instrument 29 indicates the deviation of the layer thickness from the nominal thickness and by displacement of the measuring assembly along the measuring object it may easily be determined whether the layer thickness is correct at the whole circumference of the cable. Correction of the cable-producing plant which appears desirable may immediately be effected.

The sensitivity of the device may be adjusted in two ways. The slope or sensitivity of the discriminator may be changed and adapted to the particularities of any measurement so that measurement will always be possible in the linear range of the discriminator. Preferably a discriminator is used including a condenser 57 periodically charged and discharged at the beat frequency of the mixer, whereby the slope of the characteristic of the discriminator may be adjusted by selectively connecting condensers of different value. Fine adjustment of the selectivity may additionally be obtained by means of a potentiometer connected in parallel with the measuring instrument. Another possibility to adjust the sensitivity of the device is shown in FIG. 2 wherein the discriminator output is applied to an amplifier with variable gain by means of a potentiometer 30. Fine stepless adjustment in a broad range of sensitivity may be obtained with this circuit.

During measurement the switch 37 remains connected to the slider of potentiometer 38 so that the instrument indicates zero when the measured layer has nominal thickness, the instrument indicating positive or negative values for over - thickness or under- thickness respectively. It may be incidentally noted in this connection that the present invention can be usefully employed without undertaking actual calibration. The point here is that in many applications the real (absolute) value of a deviation from the nominal thickness of the insulating layer is not required, it being only necessary to know whether there is a deviation and what the sign of the deviation is.

Periodical zero balancing is possible during measurement by throwing switch 37 to ground potential (39) and by temporarily removing the measuring assembly from the range of influence of the measuring object. By means of potentiometer 34 zero balancing is effected automatically and within short time, whereafter switch 37 may be thrown back and the measuring assembly may again be applied against the measuring object. Experiments have confirmed that zero balancing in the condition of the circuit shown in FIG. 2 results in a correct balancing for measurement when switch 37 is again connected to potentiometer 38. The drift of the frequency $f_2$ upon change over of switch 37 should be constant.

Of course the illustrated equipment may be used for various measuring devices. The device according to FIG. 1 is particularly suitable when the measuring assembly is a hand set freely portable for application at any place to be measured. If the measuring assembly is fixed in the device it may be preferable to provide a displaceable slide such as slide 5 for the calibrating sample 23 such that the latter may be approached towards the measuring assembly.

The order of zero balancing under measuring conditions and zero balancing under reference conditions may be changed when preparing the device for measurement. In this case the measuring assembly 10 would first be approached towards the calibrating sample to a distance equal to the nominal thickness and switch 37 would be connected to ground (39) and balancing would be effected until the instrument indicates zero, whereafter switch 37 would be connected to the potentiometer 38 and the measuring assembly 10 would be removed from the range of influence of sample 23 for effecting the zero balancing under reference conditions. In any case balancing of the oscillators for different conditions is made, but it may be assumed that later reference balancing during measurement under the one condition is equivalent to a balancing under the other conditions, that is under measuring conditions.

Figure 4:
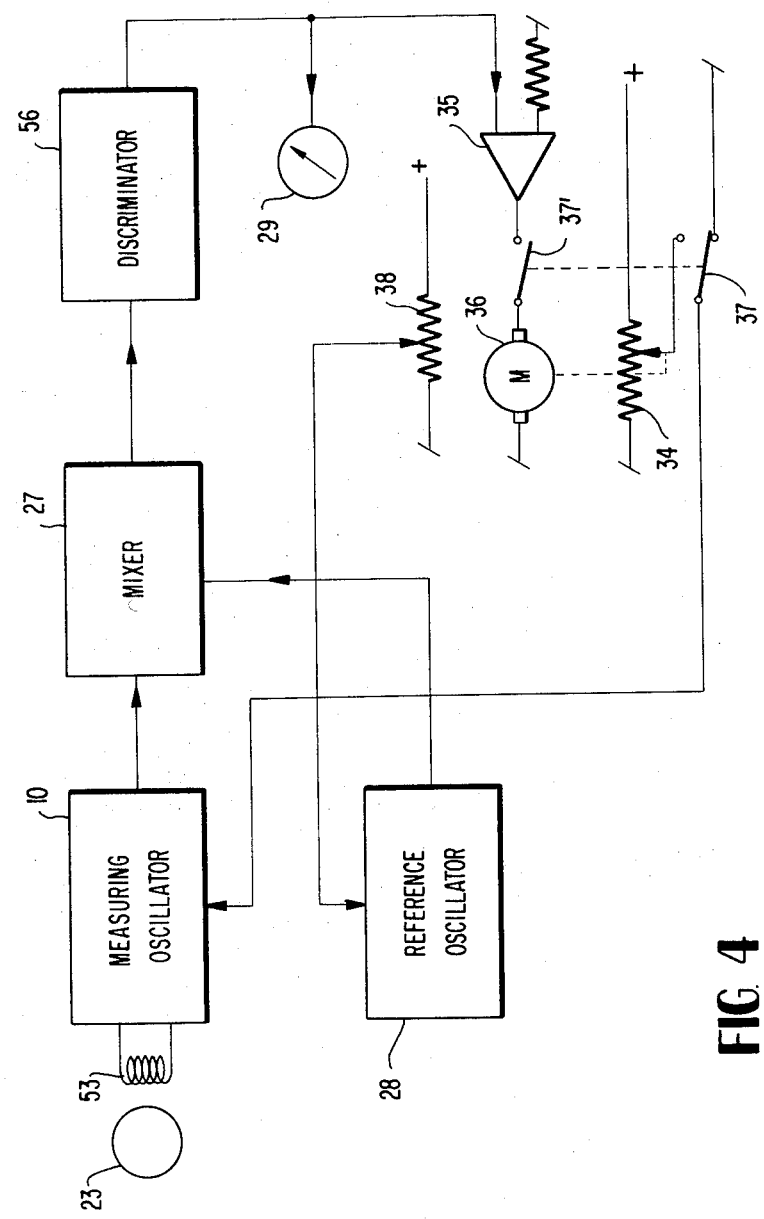
FIG. 4 is a schematic electrical diagram of an alternate embodiment of the invention.

Balancing of the frequency drift of the measuring oscillator when shifting the measuring assembly from its measuring position into its reference position outside the influencing range of metallic parts, can also be achieved in another manner. Instead of providing a switch 37 in the circuit of the comparing oscillator 28, this switch may be provided for selective control of the measuring oscillator alternatively by means of potentiometer 34 and by fixed reference potential. FIG. 4, wherein similar parts are designated by the same reference numerals as used in FIG. 2, and wherein circuits 10, 27, 28 and 56 are shown in a more schematic manner, shows the modified circuit, the only difference being that the reference oscillator is exclusively controllable by means of potentiometer 38, while the change-over switch 37 is now connected to the measuring oscillator 10, thereby allowing control of the measuring oscillator alternatively by means of potentiometer 34 or by a fixed reference potential. With switches 37 and 37' in the position as illustrated, reference potential is applied to the measuring oscillator. As described above, the frequency of this oscillator is thereby shifted by such a value that the frequency of the measuring oscillator 10 is at least approximately equal to the frequency of the reference oscillator 28 with the measuring coil 53 outside the influencing range of metallic parts. Zero balancing under reference conditions is now effected by adjustment of the frequency of reference oscillator 28 by means of potentiometer 38, until the discriminator 56 shows zero output. For zero balancing under measuring conditions, the measuring coil 53 is approached towards the sample 23 to a distance corresponding to the nominal thickness of an insulating layer. This may be achieved either by means of a sample 23 without insulating layer and the apparatus shown in FIG. 1 or by means of a sample 23' having an insulating layer of nominal thickness as indicated in FIG. 2. Switches 37 and 37' are now thrown to the upper position, whereby changeover switch 37 connects potentiometer 34 to the measuring oscillator 10 while motor 36 is connected to the output of amplifier 35. Potentiometer 34 is now adjusted automatically, as described above in connection with FIG. 2, until the frequency of the measuring oscillator 10 is again equal to the frequency of the reference oscillator. Zero balancing under measuring conditions is effected in this way. Calibration of the indicating instrument 29 may also be effected in the manner explained above. The apparatus so balanced and calibrated may now be used for measurement, whereby it is possible to repeatedly effect balancing under reference conditions as explained above by removal of the measuring coil 53 out of the range of influence of an object to be measured and by zero adjustment by means of potentiometer 38 acting on the reference oscillator 28.

It is obvious, as stated above, that the order of balancing under measuring conditions and of balancing under reference conditions may be reversed. It is further seen from a comparison of FIGS. 2 and 4 that a fully equivalent balancing program may be effected whether the change-over switch 37 allowing to act on the oscillator frequency alternatively by a fixed reference potential or by a variable potential from a potentiometer is connected to the measuring oscillator or to the reference oscillator. It is only of importance, that one of these oscillators may alternatively be influenced by an adjustable potential and a fixed reference potential while the other oscillator may be influenced independently by an adjustable potential.

This invention is not limited to the above preferred embodiments wherein frequency - modulated oscillators are used, but amplitude - modulated measuring values and comparing values may be used.

Figure 3:
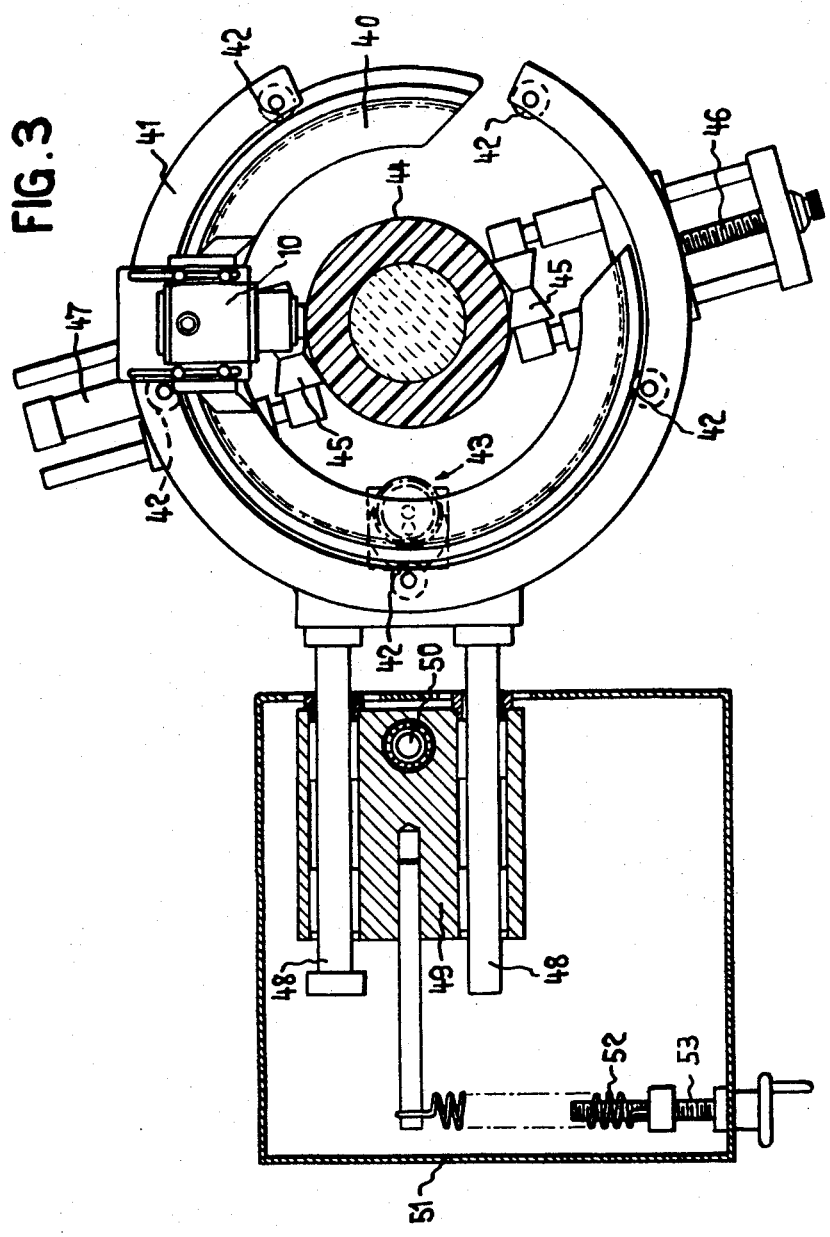
FIG. 3 shows a part of another embodiment.

While the device illustrated in FIG. 1 is perfectly suitable for simple and short measurement by hand, a mechanical support should be provided for the measuring assembly when the device is used for continuous control of objects during a manufacturing process, for instance of cables. FIG. 3 illustrates an embodiment for continuous control of cable production.

A measuring head 10, well known per se, is radially adjustably mounted on a split ring 40. Ring 40 is rotatably mounted in an outer split annular structure 41 by means of rollers 42. A schematically indicated reciprocating drive 43 imparts to the ring 40 an oscillating rotating movement at an amplitude of somewhat more than 300° as an example. A cable 44 to be tested is guided between rollers 45 radially adjustable by means of a hand-operated spindle 46 and a pneumatic cylinder 47 respectively. Structure 41 is mounted in a block 49 by means of guide rods 48 allowing shifting of the structure 41 with ring 40 in a substantially horizontal direction. Block 49 is pivotably mounted in a casing 51 by means of ball bearings and a shaft 50. A spring 52 of which the pull may be adjusted by means of spindle 53 compensates the torque exerted by the measuring system such that this system is maintained in a substantially horizontal position as illustrated.

During measurement the measuring head 10 is urged against the cable surface by spring action. The cable moves substantially in coaxial position with reference to parts 40 and 41, but such parts are displaceable in any direction and easily follow any possible curvature or lateral displacement of the cable. Therefore, no jamming may occur, because the measuring system always follows the cable without loading it. The relatively wide gaps of parts 40 and 41 allow easy insertion or removal of the cable through such gaps when brought into registering position. Of course, stiff cables can hardly be shifted to the side for removal or insertion and therefore, the measuring device may be removed from the cable or shifted onto the same. During removal or insertion of the cable, the upper roller 45 and the measuring head 10 are lifted.

During measurement the measuring head is cyclically turned to different positions, for instance four positions spaced by 90° from each other, the thickness of the cable being measured and indicated for each of these measuring positions in a manner well known in the art. When differences of the measured thickness occur in different positions the value and direction of eccentricity of the cable conductor in the insulating mantle may be determined. For zero balancing under reference conditions the measuring assembly 10 is removed from the range of influence of the cable by means of pneumatic cylinder 47. For calibration and initial zero balancing, a sample 23 may be approached towards the measuring head by means of a suitable adjustable carrier.

I claim:

1. A method for measuring the thickness of an insulating layer on a metallic body comprising:
    disposing a probe in a measuring circuit providing a measuring signal indicative of the distance of said probe from the metallic body;
    generating a comparison signal and combining said measuring and comparison signal;
    positioning said probe beyond the range of influence of a metallic body and null balancing a detection circuit connected to receive said combined measuring and comparison signals by adjusting the one of said signals while keeping the other of said signals at a predetermined reference value;
    repositioning said probe to a distance equal to the nominal thickness of the insulating layer to be measured, from a metallic body and re-balancing said detection cricuit for a null balancing by adjusting the other of said signals, while impeding adjustment of said one signal, yet permitting said measuring signal to vary due to the proximity of said metallic calibration body;
    and, thereafter
    bringing said probe into contact with the said layer to be measured and permitting said measuring signal to vary due to the proximity of said metallic body, and
    repeatedly positioning said probe beyond the range of influence of a metallic body during measurement and repeating null balancing of said detection circuit by adjusting said one signal while keeping the other of said signals at said reference value.

2. A method according to claim 1, wherein said measuring circuit comprises a first oscillator the frequency of which is varied by proximity of said probe to said metallic body; and wherein said comparison signal is generated by a second oscillator, said measuring and comparison signals being combined to provide an oscillating signal displaying a beat frequency as a function of the frequency difference of the signals combined.

3. A method according to claim 2 wherein said null balancing operations are effected by varying the frequencies of each of said oscillators by first and second frequency adjusting means.

4. A method for measuring the thickness of an insulating layer on a metallic body comprising:

disposing an inductive probe in a measuring circuit providing a measuring signal indicative of the distance of sais probe from the metallic body;

generating a comparison signal and combining said measuring and comparison signal;

positioning said inductive probe beyond the range of influence of a calibration body comprising a metallic body and null balancing a detection circuit connected to receive said combined measuring and comparison signals by adjusting said measuring signal while impeding variations in said comparison signal, said comparison signal being maintained at a predetermined value;

repositioning said probe at a distance equal to the nominal thickness of the insulating layer to be measured and re-balancing said detection circuit for a null balancing by adjusting said comparison signal while impeding adjustment of said measuring signal, yet permitting said measuring signal to vary due to the proximity of said metallic body;

positioning said probe a known distance from the calibrating body and adjusting the reading of said detection circuit to establish calibration;

and, thereafter bringing said probe into contact with the said layer to be measured, said calibration and measuring steps being conducted while continuing to impede the adjustment of said measuring signal yet permitting said measuring signal to vary due to the proximity of said metallic body.

5. A method in accordance with claim 4, wherein during the course of measurement of the layer of said probe is repeatedly positioned beyond the influence range of the part of the layer which is to be measured and balancing at said detection circuit effected.

6. A method according to claim 5, wherein said measuring circuit comprises a first oscillator the frequency of which is varied by proximity of said probe to said metallic body; and wherein said comparison signal is generated by a second oscillator, said measuring and comparison signals being combined to provide an oscillating signal displaying a beat frequency as a function of the frequency difference of the signals combined.

7. A method according to claim 6, wherein said null balancing operations are effected by varying the frequencies of each of said oscillators by first and second frequency adjusting means.

8. A method according to claim 6 wherein the null balancing operation effected with said probe removed from the influence of said body, is carried out while said second oscillator is disconnected from said second frequency adjusting means; whereby said second oscillator signal is at a determinative fixed frequency.

9. A method according to claim 8, wherein said first adjusting means includes a potentiometer driven by a servo motor, the operating switch for said motor being ganged with the switch connecting said second adjusting means to said second oscillator so that said second adjusting means is disconnected during operation of said servo motor.

10. Apparatus for measuring the thickness of insulating layers on metallic bodies in combination:

a test probe;

a measuring circuit associated with said test probe and generating a measuring signal indicative of the distance of said probe from the said metallic body;

a comparison signal generating circuit;

a signal combining means for combining said measuring and comparison signals;

detection circuit means for examining the output from said combining means;

first and second adjusting means connected respectively to said measuring and comparison signal generating circuits, for adjusting the outputs from said circuits to enable a null signal at said detecting circuit;

means for impeding adjustment of the one of said adjusting means during adjustment of said other of said adjusting means, said signal from the one of said signal-generating circuits being maintained at a predetermined value during adjustment of the other of said signal-generating circuits, said means also impeding adjustment of said other adjusting means during adjustment of said one adjusting means;

means for positioning a metallic calibrating body at a distance equal to the nominal thickness of the insulating layer of the body to be tested from said test probe;

means for displacing said probe (1) beyond the range of influence of said calibrating body to enable a nulling of said detection circuit by adjustment of the one of said adjusting means while said probe is thus displaced, (2) to said distance equal to nominal thickness from said calibration body to enable adjustment of said other adjusting means while said distance between probe and body is maintained, thereby re-nulling said detection circuit, and (3) at a predetermined distance from said calibration body for effecting calibration; and means to calibrate said detection circuit upon said displacement of said probe a predetermined distance from said calibration body, whereby to establish calibration for subsequent measuring of layers to be measured by contact with said probe.

11. Apparatus according to claim 10, wherein said measuring circuit comprises a first oscillator, the frequency of the output signal of which is varied in accordance with the proximity of said probe to the body under test; and wherein said comparison signal generator circuit comprises a second oscillator; and wherein said combining means comprises a mixer for said first and second oscillator outputs for forming a beat frequency signal therefrom constituting the measuring signal for passing toward said detector circuit; said first and second adjusting means being effective to vary the frequency of said first and second oscillators.

12. Apparatus according to claim 11, further including servo control means for at least the first circuit adjusting means, said servo means including a servo motor and switching means for activating said motor, to in turn activate said first circuit adjusting means to achieve said null.

13. Apparatus according to claim 11, wherein said first and second circuit adjusting means comprises potentiometers in control circuits including variable capacitor diodes adapted to shift the frequency of the first and second oscillator circuits respectively, the diode of the comparison oscillator circuit being selectively connectable to the potentiometer associated with said circuit and to a fixed circuit and potential respectively, according to the position of a commutator means.

14. Apparatus according to claim 10 wherein said means for displacing said probe includes at least one adjustable and one stationary carrier, with mechanical measuring means for reading the position and displacement respectively of said carriers with respect to one another, each of said carriers having at least one supporting structure for mounting at least respectively a measuring assembly and a test object thereon.

15. Apparatus according to claim 14, wherein said adjustable carrier comprises a slide displaceable by means of a measuring spindle.

16. Apparatus according to claim 15 wherein said probe is adapted for mounting on said adjustable carrier.

17. Apparatus according to claim 16 wherein a plug-in connection is provided for mounting said probe on said adjustable carrier.

18. Apparatus according to claim 17 wherein the headstock of said slide is adjustable in the direction of movement of the slide and adapted to be fixed at a desired position.

19. Apparatus according to claim 14, wherein the supporting structure includes a prismatic shaped recess for fixing an object to be measured therein.

20. Apparatus according to claim 11 further including means for adjusting the sensitivity of said detection circuit means.

21. Apparatus according to claim 11, further inclduing discriminator means connected between said mixer means and said detection circuit, the slope of the discriminator signal being adjustable thereby to vary the signal to said detecting circuit to a desired level.

22. Apparatus according to claim 21, wherein the said discriminator includes a periodically chargeable and dischargeable measuring condensor, a plurality of such condensors being present, the slope characteristics of said discriminator being varied by selectively switching in selected of said plurality of condensors.

23. Apparatus for measuring the thickness of insulating layers on metallic bodies comprising in combination:
an inductive test probe;
a measuring circuit associated with said test probe and providing a measuring signal indicative of the distance of said probe from the said metallic body;
a comparison signal generating circuit;
a signal combining means for combining said measuring and comparison signals;
detection circuit means for examining the signal derived from said combining means;
first and second adjusting means connected respectively to said measuring and comparison signal generating circuits, for adjusting the output from said circuits to enable a null signal at said detecting circuit;
means for impeding adjustment of said second adjusting means during adjustment of said first adjusting means, said signal from said comparison signal circuit being maintained at a predetermined value during adjustment of said measuring circuit, said means also impeding adjustment of said first adjusting means during adjustment of said second adjusting means and during subsequent calibration and measurement;
means for positioning a calibrating body comprising a metallic body at said apparatus;
means for displacing said probe (1) beyond the range of influence of said calibrating object to enable a nulling of said detection circuit by adjustment of said first adjusting means while said probe is thus displaced, (2) into contact with said calibration body to enable adjustment of said comparison circuit signal through said second adjusting means while said contact between probe and body is maintained, thereby re-nulling said detection circuit, and (3) at a predetermined distance from said calibration body for effecting calibration; and
means to calibrate said detection circuit upon said displacement of said probe a predetermined distance from said calibration body, whereby to establish calibration for subsequent measuring of layers to be measured by contact with said probe.

24. Apparatus for measuring the thickness of insulating layers on metallic bodies comprising in combination:
a test probe;
a measuring circuit associated with said test probe and generating a measuring signal indicative of the distance of said probe from said metallic body;
a comparison signal-generating circuit, said measuring circuit and said comparison signal generating circuit forming signal-generating circuits;
a signal combining means for combining said measuring and comparison signals;
a detection circuit means for examining the output signal from said combining means;
two independent adjusting means associated each with one of said signal-generaing circuits for continuously adjusting within a limited range the signal generated by said signal-generating circuit;
a reference circuit and change-over switch means allowing selective connection of the one of said signal-generating circuits to said adjusting means associated therewith and to said reference circuit respectively, the signal generated by said one of said signal-generating circuits being maintained at a predetermined reference value when connected to said reference circuit;
means for positioning a metallic calibrating body at a distance equal to nominal thickness of the insulating layer of the body to be tested from said probe;
means for displacing said probe (1) beyond the range of influence of said calibrating body to enable a nulling of said detection circuit by operation of said adjusting means associated with the other signal-generating circuit while said probe is thus displaced, while the signal from said one of said signal-generating circuits is maintained at aaid reference value by positioning said change-over switch means to said reference circuit, and (2) to said distance equal to nominal thickness from said calibration body to enable adjustment of said one signal-generating circuit with said change-over switch means reversed through said adjusting means associated therewith while said distance between probe and body is maintained thereby re-nulling said detection circuit.

25. A method for measuring the thickness of an insulating layer on a metallic body comprising:

disposing an inductive probe in a measuring circuit providing a measuring signal indicative of the distance of said probe from the metallic body;

generating a comparison signal and combining said measuring and comparison signal;

positioning said inductive probe beyond the range of influence of a calibration body comprising a metallic part and null balancing a detection circuit connected to receive said combined measuring and comparison signals by adjusting said comparison signal while impeding adjustment in said measuring signal, said measuring signal being maintained at a predetermined value;

repositioning said probe to a distance equal to the nominal thickness of the insulating layer to be measured and re-balancing said detection circuit for a null balancing by adjusting said measuring signal while impeding adjustment of said comparison signal, yet permitting said measuring signal to vary due to the proximity of said metallic body;

and, thereafter bringing said probe into contact with the said layer to be measured, said measuring step being conducted while continuing to impede the adjustment of said measuring signal yet permitting said measuring signal to vary due to the proximity of said metallic body.

* * * * *